United States Patent [19]

Hair

[11] 3,763,016

[45] Oct. 2, 1973

[54] RECOVERY OF RUBBERY POLYMERS FROM SOLUTION

[75] Inventor: Robert L. Hair, University Park, N. Mex.

[73] Assignee: Phillips Petroleum Company, Bartlesville, Okla.

[22] Filed: May 28, 1971

[21] Appl. No.: 148,097

[52] U.S. Cl. ............... 203/85, 202/185 A, 203/42, 203/95, 159/165
[51] Int. Cl. ........ B01d 3/34, B01d 3/38, B01d 3/00, B01d 3/14, F28b, C02b 1/04
[58] Field of Search .................... 159/DIG. 10, 165; 260/94.7 R, 94.7 F, 94.7 H; 203/49, 95–97, 85, 42; 202/152, 161, 162, 182, 185, 195

[56] References Cited
UNITED STATES PATENTS

| | | | |
|---|---|---|---|
| 2,957,861 | 10/1960 | Goins | 260/94.9 F |
| 2,964,512 | 12/1960 | Goins | 260/94.9 F |
| 3,214,352 | 10/1965 | Wells | 202/187 |
| 3,288,685 | 11/1966 | Kemper et al. | 203/11 |
| 3,590,026 | 6/1971 | Carlson et al. | 260/94.7 R |

Primary Examiner—Norman Yudkoff
Assistant Examiner—J. Sofer
Attorney—Young & Quigg

[57] ABSTRACT

A process for recovering solvent from the overhead product produced by steam stripping a mixture of solvent and polymer in which noncondensed solvent vapors are contacted with water and introduced into a reservoir from which the liquid solvent is recovered.

4 Claims, 1 Drawing Figure

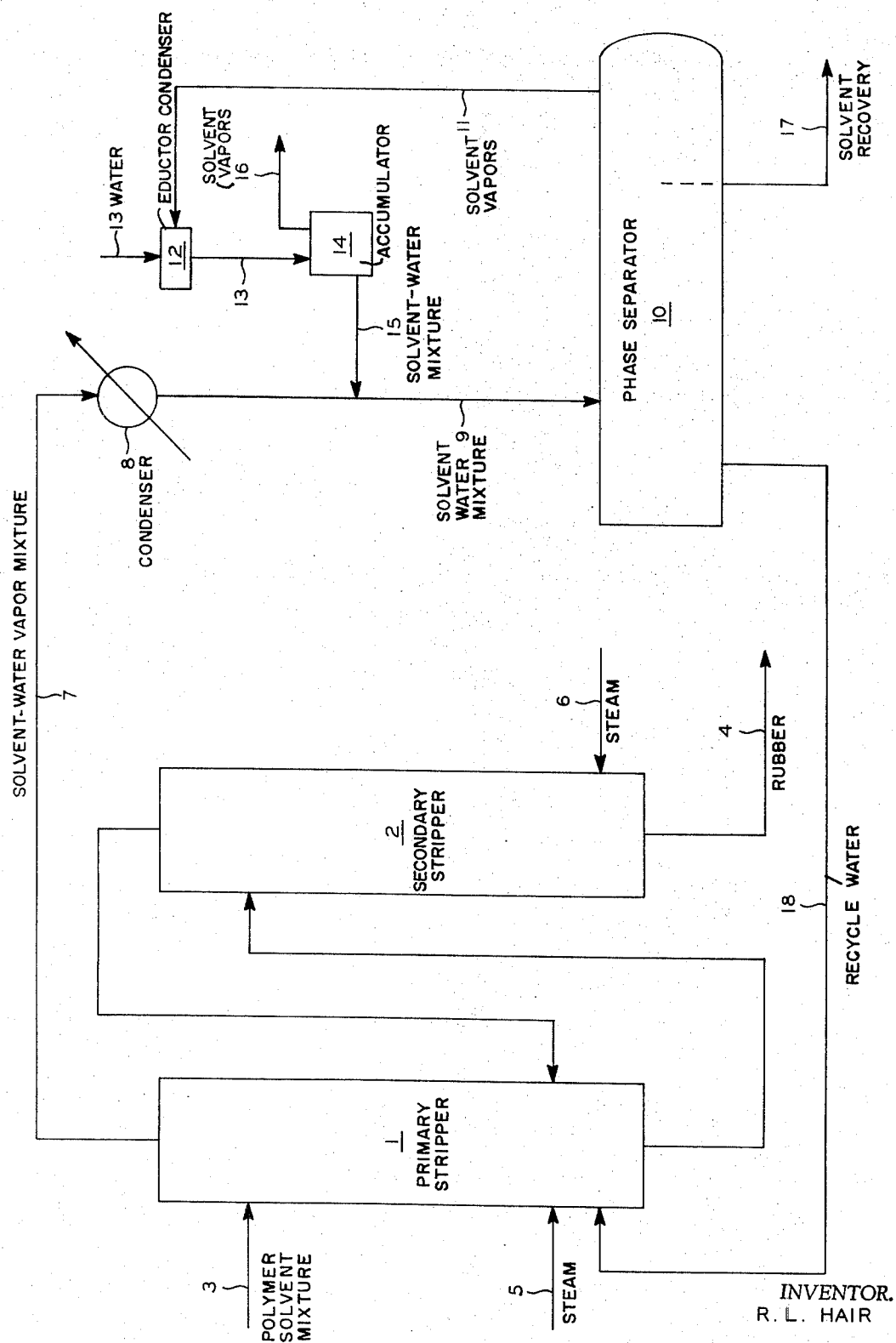

RECOVERY OF RUBBERY POLYMERS FROM SOLUTION

This invention relates to the recovery of solvent solutions of polymer and solvent.

In one of its more specific aspects, this invention relates to the recovery of rubbery polymeric materials from the solutions in which they are produced.

The production of rubbery polymer in crumb form such as described in U.S. Pat. No. 3,076,795, is well known. The process of that patent, which is included herein by reference, pertains to the production of rubbery polymers by polymerizing a monomer system comprised of one or more conjugated dienes containing four to eight carbon atoms and the recovery of the rubbery polymer from the solution in which they are produced.

Recovery is generally accomplished by use of steam strippers, operating in unison, into the first of which the rubber solution and water are introduced. The overhead from the first stripper comprising water and hydrocarbon solvent, generally toluene, is passed into a condenser from which it is passed into a reservoir phase separator. Prior to the introduction of the stripper overhead stream from the condenser into the phase separator, water is introduced into the overhead stream to further condense components in the overhead stream and to facilitate the maintenance of a low temperature within the phase separator.

This low temperature within the phase separator is important in reducing the amount of vapors vented from the separator and which generally are lost from the system. The liquid solvent is recovered for recycling to process and the condensed water is recycled, at least in part, back to the stripper. This general solvent recovery system is shown in application Ser. No. 788,766, which issued on June 29, 1971 as U.S. Pat. No. 3,590,026. This method results in some solvent losses and it is the object of this invention to provide a process which substantially eliminates such solvent losses and reduces the amount of steam necessarily introduced into the strippers to effect solvent separation. The method of this invention allows the phase separator, and hence the water returned to the stripper, to be operated at a higher temperature with the result that less heat in the form of steam needs to be introduced to the strippers.

According to this invention there is provided a method for recovering solvent from an overhead product produced by steam stripping a mixture of solvent and polymer which involves cooling the overhead product to produce a condensate comprising water, liquid solvent and solvent vapors. This condensate is introduced into a reservoir from which vapors are vented. Water is brought into contact with the vapors to reabsorb them, and the mixture is introduced into a second reservoir. Solvent vapors are vented from this reservoir with water and solvent being introduced from the second reservoir into the first reservoir from which liquid solvent is recovered. The absorption of the solvent vapors by the water is preferably carried out in an eductor condenser.

In the prior art process, the solvent-water mixture taken overhead from the stripper is passed through a condenser in which the temperature of the solvent-water mixture is reduced from about 220°–250° F. to about 160°–170° F. Prior to the entrance of the mixture into the phase separator, water is introduced into the solvent-water mixture at a rate sufficient to produce a resultant stream which enters the phase separator where it is maintained at about 150° F. From the separator, water is recycled to the strippers and toluene is recovered for reuse. Solvent vapors are vented from the separator to flare.

The method of this invention contemplates the contacting of these vapors by water and thereafter its introduction into the phase separator. For this purpose, the vapor line through which the vapors are vented from the separator preferably conducts the vapors into an eductor condenser wherein contact between the vented vapors and water is made to condense and absorb the solvent vapors. Water and the condensed solvent and absorbed solvent vapors flow into an accumulator from which water and solvent are introduced into that solvent-water mixture passing from the condenser into the phase separator, the combined stream being then introduced into the phase separator. Such solvent vapors which remain uncondensed and unabsorbed upon introduction into the accumulator are vented from the accumulator and flared. Because of the increased condensation efficiency resulting from the use of an eductor condenser, the phase separator temperature can be maintained at about 175° F. instead of the prior art temperature of about 150° F. As a result, more heat is recycled with the water reintroduced into the stripper and less steam needs to be introduced into the stripper.

The method of this invention will be more easily explained by referring to the attached FIGURE in which primary stripper 1 and secondary stripper 2 are shown interrelated in the conventional manner for the introduction of the rubbery polymer-solvent mixture through conduit 3, the rubber being recovered through conduit 4 upon stripping with steam introduced through conduits 5 and 6, the solvent-water mixture being taken overhead through conduit 7 and introduced into condenser 8.

The solvent-water mixture from the condenser passes through conduit 9 into phase separator 10. Those solvent vapors vented from the separator are passed through conduit 11 into eductor condenser 12. Water is introduced into the eductor condenser through conduit 13 and the resulting mixture therefrom passes into accumulator 14 from which water and solvent are introduced into the solvent-water mixture in conduit 9 by means of conduit 15. Some uncondensed solvent is passed overhead from the accumulator through conduit 16 with solvent being recovered from phase separator through conduit 17 and water being recycled to the stripper through conduit 18. Some or all of the solvent vapors in pipe 16 may be added to those in pipe 11 to additionally condense and recover solvent vapor.

The method of this invention was applied to a system in which the phase separator had been operated at 150° F. with 95 gpm water being introduced into the solvent-water mixture in the absence of passage through the phase separator. The phase separator was maintained at about 150° F. but solvent losses from the system amounted to about 1,330,000 pounds per year.

Employing the method of this invention, 95 gpm water was introduced into an eductor condenser with the solvent vapors from the phase separator, and into the accumulator from which it was introduced into the phase separator which was maintained at a temperature of 175° F. Solvent vapor loss from the accumulator amounted to only 33,000 pounds per year and steam reduction to the stripper amounted to 49,500,000 pounds per year.

While the method of this invention has been described with reference to a specific apparatus, it will be evident that the method of this invention is applicable to any steam distillation system in which solvent steam is distilled overhead, cooled, condensed and accumulated in an accumulator from which solvent vapors are vented with separation of water and liquid solvent.

It will be evident from the foregoing that various modifications can be made to the method of this invention. Such are considered, however, to be within the scope of the invention.

What is claimed is:

1. A process for recovering solvent from an overhead product produced by steam stripping a mixture of solvent and polymer which comprises:
   a. cooling said overhead product to produce a condensate comprising water, liquid solvent and solvent vapors;
   b. introducing said condensate into a first reservoir;
   c. venting solvent vapors from said first reservoir;
   d. contacting said solvent vapors from said first reservoir with water in an eductor condenser to produce a solution comprising water and solvent;
   e. introducing said solution of water and solvent into a second reservoir apart and distinct from said first reservoir;
   f. passing solvent as a vapor from said second reservoir to rejoin the solvent vapors vented from the first reservoir;
   g. passing water and condensed solvent from said second reservoir to said first reservoir; and
   h. recovering said solvent as a liquid from said first reservoir.

2. The method of claim 1 wherein said first reservoir is held at a temperature of about 175° F.

3. The method of claim 1 wherein said solution comprising water and solvent from said second reservoir is introduced into said condensate prior to entry into said first reservoir.

4. The method of claim 3 in which said first reservoir is held at about 175° F.

* * * * *